United States Patent
Chen et al.

(10) Patent No.: US 11,050,664 B2
(45) Date of Patent: Jun. 29, 2021

(54) ENCAPSULATION METHOD, DEVICE AND NODE

(71) Applicant: ZTE CORPORATION, Guangdong (CN)

(72) Inventors: Ran Chen, Guangdong (CN); Min Xiao, Guangdong (CN)

(73) Assignee: ZTE CORPORATION, Guangdong (CN)

(*) Notice: Subject to any disclaimer, the term of this patent is extended or adjusted under 35 U.S.C. 154(b) by 40 days.

(21) Appl. No.: 16/604,996

(22) PCT Filed: Apr. 13, 2018

(86) PCT No.: PCT/CN2018/083099
§ 371 (c)(1),
(2) Date: Oct. 12, 2019

(87) PCT Pub. No.: WO2018/188661
PCT Pub. Date: Oct. 18, 2018

(65) Prior Publication Data
US 2020/0162375 A1    May 21, 2020

(30) Foreign Application Priority Data
Apr. 13, 2017  (CN) .......................... 201710240776.4

(51) Int. Cl.
*H04L 12/723*     (2013.01)
*H04L 12/24*      (2006.01)
(Continued)

(52) U.S. Cl.
CPC .......... *H04L 45/50* (2013.01); *H04L 41/5009* (2013.01); *H04L 45/304* (2013.01); *H04L 45/745* (2013.01); *H04L 2212/00* (2013.01)

(58) Field of Classification Search
CPC ....... H04L 45/30; H04L 45/304; H04L 45/50; H04L 45/74; H04L 45/745; H04L 41/50; H04L 41/5009; H04L 2212/00
See application file for complete search history.

(56) References Cited

U.S. PATENT DOCUMENTS

2016/0315819 A1* 10/2016 Dara ................... H04L 61/6059
2017/0111209 A1   4/2017 Ward et al.
(Continued)

FOREIGN PATENT DOCUMENTS

| CN | 105024985 A | 11/2015 |
| CN | 105324957 A | 2/2016 |
| CN | 105871721 A | 8/2016 |

OTHER PUBLICATIONS

Brockners et al., "Data Fields for In-situ OAM", Mar. 13, 2017, IETF, draft-brockners-inband-oam-data-03, pp. 1-25 (Year: 2017).*

(Continued)

*Primary Examiner* — Paul H Masur
(74) *Attorney, Agent, or Firm* — Li & Cai Intellectual Property (USA) Office

(57) ABSTRACT

An encapsulation method, an encapsulation device and an encapsulation node are disclosed. The encapsulation method includes: embedding, at an encapsulation node in an in-situ operation administration and maintenance, IOAM, domain, IOAM information in a segment routing multi-protocol label switching, SR MPLS, header. The IOAM information includes: an IOAM header and an IOAM payload. The IOAM header includes a MPLS label value assigned by internet assigned numbers authority, IANA; and the IOAM header further includes at least one of: a value identifying whether the IOAM header is at a bottom of a stack, a packet priority field, and an encoded time-to-live value.

14 Claims, 2 Drawing Sheets

| SID | TC | S | TTL |
|---|---|---|---|
| IOAM(Special MPLS label) | TC | S | TTL |
| POT TLV ||||
| Payload ||||

(51) Int. Cl.
*H04L 12/725* (2013.01)
*H04L 12/741* (2013.01)

(56) References Cited

U.S. PATENT DOCUMENTS

2017/0250907 A1    8/2017  Pignataro et al.
2018/0176134 A1*   6/2018  Pignataro ................ H04L 47/12

OTHER PUBLICATIONS

Brockners et al., "Encapsulations for In-situ OAM Data", Mar. 13, 2017, IETF, draft-brockners-inband-oam-transport-03 , pp. 1-25 (Year: 2017).*
WIPO, International Search Report dated Jun. 15, 2018; English translation of PCT-ISA-210 attached.
European Patent Office, The extended European search report dated Nov. 2, 2020 for application No. EP18784990.6
Brockners, et al., "Encapsulations for In-situ OAM Data draft-brockners-inband oam transport-03" , Internet Engineering Task Force, StandardWorkingDraft, Mar. 13, 2017.
Brockners, et al., "Encapsulations for In-band OAM Data draft-brockners-inband oam transport-01", Internet Engineering Task Force, StandardWorkingDraft, Jul. 18, 2016.

* cited by examiner

| SID | TC | S | TTL |
| --- | --- | --- | --- |
| IOAM(Special MPLS label) | TC | S | TTL |
| POT TLV ||||
| Payload ||||
FIG. 4
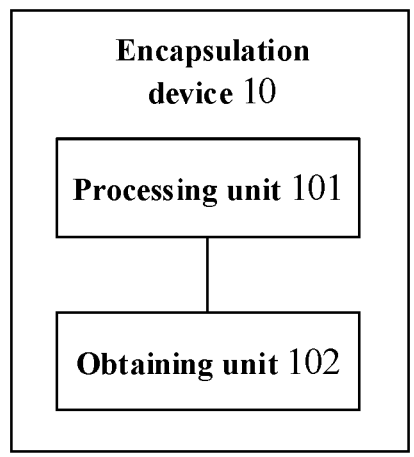
FIG. 5
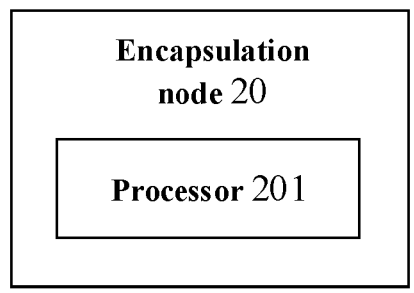
FIG. 6

ENCAPSULATION METHOD, DEVICE AND NODE

TECHNICAL FIELD

The present disclosure relates to the field of communication technology, for example, to an encapsulation method, an encapsulation device, and an encapsulation node.

BACKGROUND

The internet engineering task force (IETF) proposed segment routing (SR) technology. The SR is a method for routing based on a source address, wherein by superimposing on a data packet SR information that affects current shortest path forwarding, the data packet is forwarded according to a shortest path specified by path node information. Segment routing makes it easy to implement complex network functions such as network load balancing and traffic engineering, as well as fast rerouting.

Recently, the IETF proposed in-situ operation administration and maintenance (IOAM). IOAM is sent with a data packet, and no additional control plane packet is required to send operation administration and maintenance (OAM) data. IOAM is generally deployed in a specific domain. IOAM can implement various complex OAM functions such as path tracking, path verification, and service-level agreement (SLA) authentication.

Depending on deployment, IOAM can be used in different scenarios, such as internet protocol version 6 (IPV6), virtual extensible LAN-generic protocol extension (VXLAN-GPE), service function chaining (SFC) and segment routing (SR).

However, in some cases, path verification cannot be performed using IOAM in an SR multi-protocol label switching (MPLS) scenario.

SUMMARY

Embodiments of the disclosure provide an encapsulation method, an encapsulation device and an encapsulation node, and solve a problem of using the in-situ OAM for path verification in an SR MPLS scenario.

An embodiment of the present disclosure provides an encapsulation method, including: embedding, at an encapsulation node in an in-situ operation administration and maintenance (IOAM) domain, IOAM information in a segment routing multi-protocol label switching (SR MPLS) header.

An embodiment of the present disclosure provides an encapsulation device, including: a processing unit configured to embed, at an encapsulation node in an in-situ operation administration and maintenance (IOAM) domain, IOAM information in a segment routing multi-protocol label switching (SR MPLS) header.

An embodiment of the present disclosure further provides an encapsulation node, including: a processor configured to embed, at an encapsulation node in an in-situ operation administration and maintenance (IOAM) domain, IOAM information in a segment routing multi-protocol label switching (SR MPLS) header.

An embodiment of the present disclosure further provides a computer readable storage medium storing a computer program, which causes, when executed by a processor, implementation of the method described above.

Embodiments of the present disclosure provides an encapsulation method, an encapsulation device and an encapsulation node for embedding, at an encapsulation node in an in-situ operation administration and maintenance (IOAM) domain, IOAM information in a segment routing multi-protocol label switching (SR MPLS) header. The encapsulation method, encapsulation device and encapsulation node provided by embodiments of the present disclosure can apply the in-situ OAM technology to the SR MPLS, and can effectively perform path verification in the SR MPLS scenario.

BRIEF DESCRIPTION OF THE DRAWINGS

FIG. 4 is a schematic diagram illustrating a packet encapsulation format provided by an embodiment;

FIG. 5 is a schematic diagram illustrating a structure of an encapsulation device according to an embodiment; and FIG. 6 is a schematic diagram illustrating a structure of an encapsulation node according to an embodiment.

DETAILED DESCRIPTION

Figure 1:
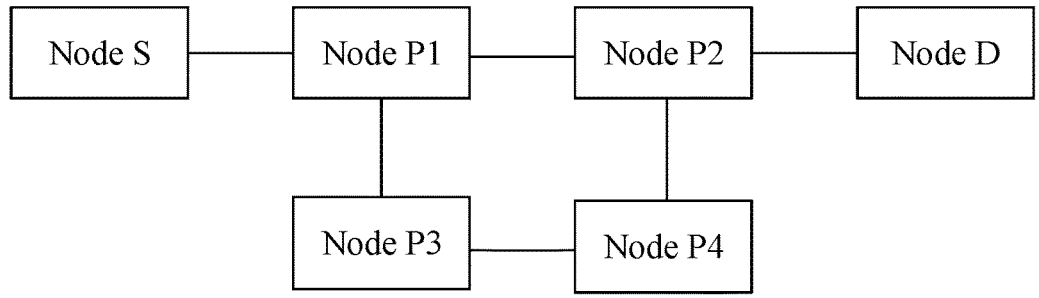
FIG. 1 is a schematic diagram illustrating a connection of an SR network according to an embodiment.

In the SR technology, a method for routing and forwarding data packets based on a source address may include: for a data plane, forwarding, by a source node, a data packet through a segment list, and for a multi-protocol label switching (MPLS) forwarding plane, converting the segment list into a traditional label stack and inserting it into a packet header sent by the source node.

In the IOAM, among edge nodes of the IOAM domain, an edge node that embeds the IOAM packet in the data packet is also called an IOAM encapsulation node; and an edge node that may remove the IOAM packet and egress the IOAM domain is also called an IOAM decapsulation node. In an embodiment, the path verification method for the IOAM includes: embedding, at the encapsulation node in the IOAM domain, IOAM packet in a data packet, and filling, by an IOAM forwarding node, relevant OAM information into OAM data according to a certain algorithm; and verifying, by the decapsulation node, whether a path is consistent with a configured path according to the OAM information in the OAM data filled in by the IOAM forwarding node, and removing the IOAM data packet. Herein, path verification may also be completed by a node external to the domain, for example, by an externally configured node based on a complete IOAM data packet.

An embodiment of the present disclosure provides an encapsulation method, which may include: embedding, at an encapsulation node in an IOAM domain, IOAM information in a SR MPLS header. The IOAM information may be used to verify whether service data is as expected or not, and may also be used to collect path information.

In an implementation, the IOAM information includes: an in-situ operation administration and maintenance header (IOAM header) and an in-situ operation administration and maintenance payload (IOAM payload), that is, the IOAM information is composed of an IOAM header and an IOAM payload. That is, the IOAM information includes: an IOAM header and an IOAM payload.

In an implementation, the IOAM header includes an MPLS label value assigned by the internet assigned numbers authority (IANA).

The IOAM header may further include at least one of: a value identifying whether the IOAM header is at a bottom of the stack, a packet priority field, and an encoded time-to-live value.

In an implementation, a length of the IOAM header is 32 bits, wherein 20 bits are used for IANA-assigned MPLS label, 1 bit is used for identifying whether the IOAM header is at the bottom of the stack, 3 bits are used for a packet priority field valued from 0 to 7, and 8 bits are used for an encoded time-to-live value.

The IOAM payload is a proof of transit type length value (POT TLV), and the IOAM payload is used by an intermediate node to fill the IOAM information in IOAM data according to a preset algorithm.

In an implementation, the embedding the IOAM information in the SR MPLS header includes: inserting the IOAM header into a SR MPLS label stack, and inserting the IOAM payload between the SR MPLS label stack and a data packet.

In an implementation, the IOAM domain includes an IOAM encapsulation node and an IOAM forwarding node. The IOAM encapsulation node inserts the IOAM header into the SR MPLS label stack, and inserts the IOAM payload between the SR MPLS label stack and the data packet, that is, the IOAM payload is inserted after the SR MPLS label stack and before the data packet. When the IOAM header is at the bottom of the SR MPLS label stack, the IOAM payload is immediately after the IOAM header. The IOAM forwarding node fills relevant OAM information into the IOAM payload according to an algorithm specified in the IOAM payload.

In an implementation, the inserting the IOAM header into the SR MPLS label stack includes: obtaining a readable label depth (RLD) value of a label switching router (LSR) included in a SR network by using interior gateway protocol (IGP), and inserting the IOAM header into the RLD of each LSR through which a label switching path (LSP) passes. That is, the RLD value of the LSR included in the SR network is obtained by the IGP, and the IOAM header is inserted into the SR MPLS label stack, wherein the location of the insertion is within a stack depth range of the label stack identified by the RLD value of each LSR through which the LSP passes, such that each LSR through which the LSP passes processing of the IOAM information.

In an embodiment, a packet carrying the IOAM information may be identified by a MPLS label assigned by the IANA.

In an implementation, the inserting the IOAM header into the SR MPLS label stack, wherein the location of the insertion is within the stack depth range of the label stack identified by the RLD value of each LSR through which the LSP passes includes: determining, when a number of the IOAM headers for insertion is limited, a minimum RLD value in RLD values corresponding to each LSR through which the LSP passes, and inserting the IOAM header into a location of the label stack identified by the minimum RLD value.

In an implementation, the inserting the IOAM header into the SR MPLS label stack includes: inserting a single IOAM header into the bottom of the SR MPLS label stack, when the single IOAM header is allowed to be inserted into any stack depth of the SR MPLS label stack.

In an implementation, the inserting the IOAM header into the SR MPLS label stack includes: inserting the IOAM header into the SR MPLS label stack according to a stack depth specified by each LSR, when a number of the IOAM headers for insertion is not limited and insertion requirements for specified stack depth of different LSRs are satisfied.

The encapsulation method provided by embodiments of the present disclosure can apply the in-situ OAM technology to the SR MPLS, and can effectively perform path verification in the SR MPLS scenario.

An embodiment of the present disclosure further provides an encapsulation method. The method may include: obtaining readable label depth (RLD) values of all label switching routers (LSRs) included in a segment routing SR network by using interior gateway protocol (IGP), and inserting the IOAM header into the RLD of each LSR through which a LSP passes, and inserting the IOAM payload between the SR MPLS label stack and a data packet.

In an embodiment, the encapsulation node inserts the IOAM header into the SR MPLS label stack and inserts the IOAM payload between the SR MPLS label stack and the data packet, and the IOAM forwarding node fills relevant OAM information in the IOAM payload according to an algorithm specified in the IOAM payload. Each LSR has its own ability to handle a depth of the label stack by a forwarding plane, which is referred to as readable label depth (RLD). If a position where the IOAM header is inserted into the SR MPLS label stack of a packet received by a LSR is not within a RLD range of the LSR, the effect of the in-situ OAM detection will be affected. Therefore, an insertion position needs to be given when the IOAM header is inserted into the SR MPLS label stack.

As shown in FIG. 1, which is a schematic diagram illustrating a connection of an SR network provided by an embodiment, the SR network includes an encapsulation node S, a node P1, a node P2, a node P3, a node P4, and a node D. All nodes in FIG. 1 can support SR, and can support IOAM. That is, within the SR network, each node may be referred to as an LSR; in the IOAM domain, the node S is an encapsulation node, the nodes P1, P2, P3, and P4 are forwarding nodes, and the node D is a decapsulation node. As shown in FIG. 1, a data packet is sent from node S to node D.

SN is a segment ID (SID) of node N, then a SID of the node S is SS, a SID of the node P1 is SP1, and so on. At the node S, the segment list may be <SP1, SP2, SD>, and the segment list may be converted to the SR MPLS label stack.

In order to enable in-situ OAM detection, IOAM information needs to be introduced. In order to make the IOAM header within the RLD range of each LSR along the LSP to a greatest extent, the method provided by an embodiment of the present disclosure may insert multiple IOAM headers in the SR MPLS label stack, as long as the LSR identified by the (segment) label (SID) on each IOAM header supports IOAM processing.

Figure 2:
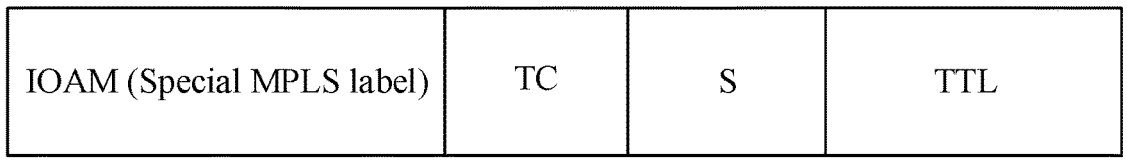
FIG. 2 is a schematic diagram illustrating a format of an IOAM header according to an embodiment.

FIG. 2 is a schematic diagram illustrating a format of an IOAM header according to an embodiment. As shown in FIG. 2, the IOAM header includes 32 bits, wherein 20 bits are used for a special MPLS label, which needs to be assigned a specific value by IANA; TC: 3 bits for a packet priority field ranging from 0 to 7; S is 1 bit to indicate whether being at a bottom of a label stack, S being set to 1 represents a label indicating a last entry in a label stack (i.e., the bottom of the stack), S being set to 0 represents a label indicating a label stack except the bottom of the stack; Time To Live (TTL): a 8 bit-field used for an encoded time-to-live value.

In an embodiment, the IOAM payload may be a POT TLV used by an intermediate node to fill relevant OAM information into the OAM data according to a certain algorithm.

Figure 3:
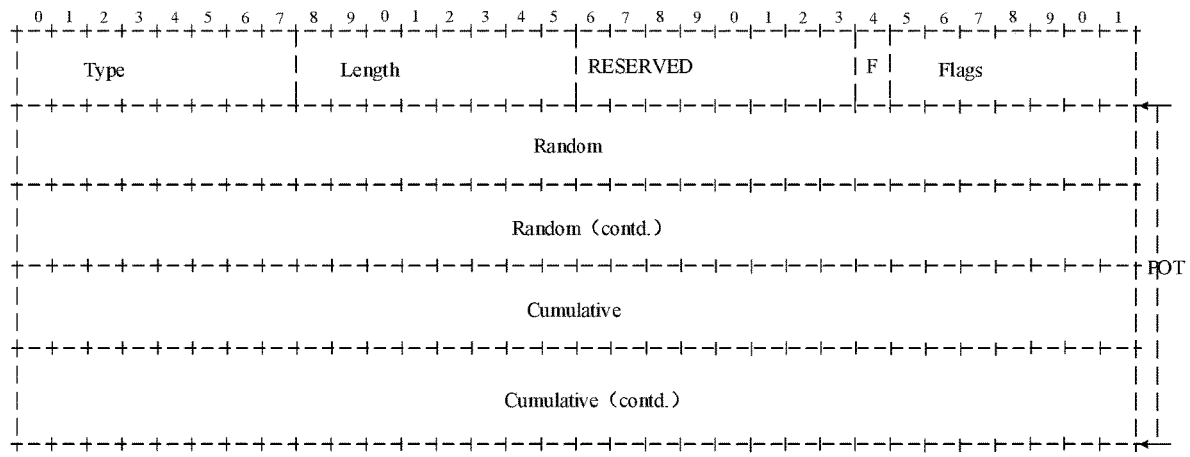
FIG. 3 is a schematic diagram illustrating a format of a POP TLV according to an embodiment.

FIG. 3 is a schematic diagram illustrating a format of a POP TLV according to an embodiment. As shown in FIG. 3, the POT TLV includes the following fields: Type: a filed indicates that IOAM data of a POT type is carried, and a value of the field is assigned by the IANA; Length: a filed takes a value of 18, indicating a length of the IOAM data (excluding fields such as Label, class of service (COS), S, TTL); RESERVED: a reserved field of 8 bits, cleared when sending, and ignored when receiving; F: a 1 bit identification, indicates which path verification instance POT-profile is active, wherein 0 indicates that even-numbered POT-profiles are active, and 1 indicates that odd-numbered POT-profiles are active; Flags: a flag field, not defined yet; Random: 64-bit random number; Cumulative: 64-bit accumulated number, which is updated on each node of a path to be verified.

In an implementation, the IOAM header is inserted into a label stack within the RLD range of each LSR through which the LSP passes.

In an embodiment, inserting the IOAM header into the SR MPLS label stack may include the following manner.

For a LSR with a limitation on a number of IOAM headers for insertion, the IOAM header may be inserted to a deepest position of the SR MPLS label stack. The IOAM header is inserted into a RLD of as many LSRs as possible on the LSP, when the IOAM header is inserted by an encapsulation node of the IOAM domain. That is, when a number of the IOAM headers for insertion is limited, a minimum RLD value in RLD values corresponding to each LSR through which the LSP passes is determined, and the IOAM header is inserted into a location of the label stack identified by the minimum RLD value. In an embodiment, the number of the IOAM headers for insertion being limited refers to that the number of IOAM headers inserted to the SR MPLS label stack satisfies a requirement of a LSR of an encapsulation node, or satisfies a requirement of a LSR of an intermediate node, or satisfies a requirement of LSRs of both the encapsulation node and the intermediate node.

Herein, the deepest position of the SR MPLS label stack refers to the deepest position of the SR MPLS label stack in the RLD range.

In an embodiment, a principle of inserting an IOAM header includes: for an LSR with a limitation on a number of IOAM headers for insertion, inserting an IOAM header in a deeper position of the label stack; when inserting an IOAM header, a LSR should insert the IOAM header within RLDs of as many LSRs as possible on the LSP; after the above conditions are satisfied, an LSR should insert as small number of IOAM headers as possible. Each LSR can obtain RLD values of all LSRs in the SR network through the IGP protocol.

In an embodiment, as shown in FIG. 1, according to the insertion principle provided by an embodiment of the present disclosure, the IOAM header is inserted into two locations: <SP1, IOAM header, SP2, SD, IOAM header>, and the two IOAM headers are the same, and are used for identifying the IOAM data being carried in a SR packet. Nodes supporting the IOAM and the SR need to fill in relevant OAM information.

The encapsulation method provided by embodiments of the present disclosure can apply the in-situ OAM technology to the SR MPLS, and can effectively perform path verification in the SR MPLS scenario; and the insertion position of the IOAM header is provided, thereby improving the effect of in-situ OAM detection.

An embodiment of the present disclosure provides another encapsulation method, which may include: inserting a single IOAM header into the bottom of the SR MPLS label stack, when the single IOAM header is allowed to be inserted into any stack depth of the SR MPLS label stack.

In an embodiment, when a hardware can support inserting a single IOAM header to any stack depth, and an intermediate node needs to parse a deep label stack to recognize whether the IOAM data is carried in the SR data packet, the IOAM header is inserted into a bottom of the SR MPLS label stack, and the encapsulation format may be, for example, the format shown in FIG. 4.

As shown in FIG. 4, a data packet includes a plurality of SR MPLS labels, an IOAM header, an IOAM payload, and a data packet payload.

An encapsulation structure of a label in the SR MPLS label stack includes: SID: segment ID; TC: 3 bits for a packet priority field ranging from 0 to 7; S, 1 bit to indicate whether being at a bottom of a label stack, S being set to 1 represents a label indicating a last entry in a label stack (i.e., the bottom of the stack), S being set to 0 represents a label indicating a label stack except the bottom of the stack; and TTL: a 8 bit-field used for an encoded time-to-live value.

An encapsulation structure of a SR MPLS label stack includes multiple labels.

An IOAM header includes 32 bits, wherein 20 bits are used for a special MPLS label, which needs to be assigned a specific value by IANA; TC: 3 bits for a packet priority field ranging from 0 to 7; S, 1 bit to indicate whether being at a bottom of a label stack, S being set to 1 represents a label indicating a last entry in a label stack (i.e., the bottom of the stack), S being set to 0 represents a label indicating a label stack except the bottom of the stack; and TTL: a 8 bit-field used for an encoded time-to-live value.

Fields included in the IOAM payload-POT TLV have been described in the above embodiments, and will not be repeated again herein.

In an embodiment, as shown in FIG. 1, according to the insertion principle of an embodiment of the present disclosure, the IOAM header is inserted to a bottom of the SR MPLS label stack: <SP1, SP2, SD, IOAM header>, wherein the IOAM header may be used for identifying that IOAM data is carried in a SR packet. Nodes supporting the IOAM and the SR need to fill in relevant OAM information.

The encapsulation method provided by embodiments of the present disclosure can apply the in-situ OAM technology to the SR MPLS, and can effectively perform path verification in the SR MPLS scenario; and the insertion position of the IOAM header is provided, thereby improving the effect of in-situ OAM detection.

An embodiment of the present disclosure provides another encapsulation method, the method may include: inserting the IOAM header into the SR MPLS label stack according to a stack depth specified by each LSR, when a number of the IOAM headers for insertion is not limited and insertion requirements for specified stack depth of different LSRs are satisfied.

In an embodiment, the encapsulation node can insert the IOAM header according to the specified stack depth, which may cause the encapsulation node to insert multiple IOAM headers to meet the insertion requirements of specified stack depth of different LSRs. Therefore, the method can be applied to a case where a number of the IOAM headers is not limited when inserting the IOAM headers by the encapsulation node, and the encapsulation node knows how to meet the insertion requirements of different LSRs along the LSP.

In an embodiment, as shown in FIG. 1, according to the insertion principle of an embodiment of the present disclosure, for example, if P1 expects the IOAM header to be at a location of a second layer, then the segment list may be <SP1, SP2, IOAM header, SD>; wherein the IOAM header is used for identifying that the IOAM data is carried in the SR packet, and a node supporting the IOAM and the SR needs to fill in relevant OAM information.

The encapsulation method provided by embodiments of the present disclosure can apply the in-situ OAM technology to the SR MPLS, and can effectively perform path verification in the SR MPLS scenario; moreover, the insertion position of the IOAM header is provided, thereby improving the effect of in-situ OAM detection.

An embodiment of the present disclosure provides an encapsulation device 10. As shown in FIG. 5, the device 10 includes: a processing unit 101, configured to embed, at an encapsulation node in an in-situ operation administration and maintenance (IOAM) domain, IOAM information in a segment routing multi-protocol label switching (SR MPLS) header.

In an embodiment, the IOAM information includes: an IOAM header and an IOAM payload.

In an embodiment, the processing unit 101 is configured to insert the IOAM header into a SR MPLS label stack, and insert the IOAM payload between the SR MPLS label stack and a data packet.

In an embodiment, the processing unit 101 is configured to identify a data packet carrying the IOAM information by an MPLS label assigned by internet assigned numbers authority (IANA).

In an embodiment, the IOAM header includes a MPLS label value assigned by IANA.

The IOAM header further includes at least one of: a value identifying whether the IOAM header is at a bottom of the stack, a packet priority field, and an encoded time-to-live value.

In an embodiment, the IOAM payload is a proof of transit type length value (POT TLV), and the IOAM payload is used by an intermediate node to fill the IOAM information in IOAM data according to a preset algorithm.

In an embodiment, as shown in FIG. 5, the device further includes: an obtaining unit 102 configured to obtain a readable label depth (RLD) value of a label switching router (LSR) included in a SR network by using interior gateway protocol (IGP).

The processing unit 101 is configured to insert the IOAM header into the SR MPLS label stack, wherein a location of the insertion is within a stack depth range of the label stack identified by the RLD value of each LSR through which a label switching path (LSP) passes, such that each LSR through which the LSP passes supports processing of the IOAM information.

In an embodiment, the processing unit 101 is configured to determine, when a number of the IOAM headers for insertion is limited, a minimum RLD value in RLD values corresponding to each LSR through which the LSP passes, and insert the IOAM header into a location of the label stack identified by the minimum RLD value.

In an embodiment, the processing unit 101 is further configured to insert a single IOAM header into the bottom of the SR MPLS label stack, when the single IOAM header is allowed to be inserted into any stack depth of the SR MPLS label stack.

In an embodiment, the processing unit 101 is further configured to insert the IOAM header into the SR MPLS label stack according to a stack depth specified by each LSR, when a number of the IOAM headers for insertion is not limited and insertion requirements for specified stack depth of different LSRs are satisfied.

For understanding of the encapsulation device provided by an embodiment of the present disclosure, reference may be made to the description of the foregoing embodiments of the encapsulation method, and details will not be repeated herein again.

The encapsulation device provided by embodiments of the present disclosure can apply the in-situ OAM technology to the SR MPLS, and can effectively perform path verification in the SR MPLS scenario; moreover, the insertion position of the IOAM header is provided, thereby improving the effect of in-situ OAM detection.

An embodiment of the present disclosure further provides an encapsulation node 20. As shown in FIG. 6, the encapsulation node includes a processor 201 configured to embed, at an encapsulation node in an in-situ operation administration and maintenance (IOAM) domain, IOAM information in a segment routing multi-protocol label switching (SR MPLS) header.

In an embodiment, the IOAM information includes: an IOAM header and an IOAM payload.

In an embodiment, the processor 201 is configured to insert the IOAM header into a SR MPLS label stack, and insert the IOAM payload between the SR MPLS label stack and a data packet.

In an embodiment, the processor 201 is configured to identify a data packet carrying the IOAM information by a multi-protocol label switching (MPLS) label assigned by internet assigned numbers authority (IANA).

In an embodiment, the IOAM header includes a MPLS label value assigned by IANA; and the IOAM header further includes at least one of: a value identifying whether the IOAM header is at a bottom of the stack, a packet priority field, and an encoded time-to-live value.

In an embodiment, the IOAM payload is a POT TLV, and the IOAM payload is used by an intermediate node in the IOAM domain to fill the IOAM information in IOAM data according to a preset algorithm.

In an embodiment, the processor 201 is configured to insert the IOAM header into the SR MPLS label stack, wherein a location of the insertion is within a stack depth range of the label stack identified by the RLD value of each LSR through which a label switching path (LSP) passes, such that each LSR through which the LSP passes supports processing of the IOAM information.

In an embodiment, the processor 201 is configured to determine, when a number of the IOAM headers for insertion is limited, a minimum RLD value in RLD values corresponding to each LSR through which the LSP passes, and insert the IOAM header into a location of the label stack identified by the minimum RLD value.

In an embodiment, the processor 201 is further configured to insert a single IOAM header into the bottom of the SR MPLS label stack, when the single IOAM header is allowed to be inserted into any stack depth of the SR MPLS label stack.

In an embodiment, the processor 201 is further configured to insert the IOAM header into the SR MPLS label stack according to a stack depth specified by each LSR, when a number of the IOAM headers for insertion is not limited and insertion requirements for specified stack depth of different LSRs are satisfied.

For understanding of the encapsulation node provided by an embodiment of the present disclosure, reference may be made to the description of the foregoing embodiments of the encapsulation method, and details will not be repeated herein again.

The encapsulation node provided by embodiments of the present disclosure can apply the in-situ OAM technology to the SR MPLS, and can effectively perform path verification in the SR MPLS scenario; moreover, the insertion position of the IOAM header is provided, thereby improving the effect of in-situ OAM detection.

An embodiment of the present disclosure further provides a storage medium storing thereon computer executable instructions, which causes, when executed by a processor, implementation of an encapsulation method including: embedding, at an encapsulation node in an in-situ operation administration and maintenance (IOAM) domain, IOAM information in a segment routing multi-protocol label switching (SR MPLS) header.

In an embodiment, the computer executable instructions, when executed by a computer processor, may also be configured to perform a technical solution of an encapsulation method provided by any embodiment of the present disclosure.

Those skilled in the art will appreciate that embodiments of the present disclosure can be provided as a method, system, or computer program product. Accordingly, the present disclosure can take a form of a hardware embodiment, a software embodiment, or a combination of software and hardware aspects. Moreover, the disclosure can take a form of a computer program product embodied on one or more computer executable storage media (including but not limited to a disk storage and optical storage, etc.) including computer executable program code.

The present disclosure has been described with reference to a flowchart and/or block diagram of a method, a device (system), and a computer program product according to embodiments of the disclosure. It will be understood that each step and/or block of the flowchart and/or the block diagram and a combination thereof may be implemented by computer program instructions. These computer program instructions may be provided to a processor of a general purpose computer, a special purpose computer, an embedded processor, or other programmable data processing apparatus to produce a machine, such that instructions for execution by a computer or other programmable data processing device may produce a means for implementing functions specified in one or more steps of the flow chart and/or in one or more blocks of the block diagram.

The computer program instructions may also be stored in a computer readable memory that can direct a computer or other programmable data processing device to operate in a particular manner, such that the instructions stored in the computer readable memory produce an article of manufacture including an instruction device for implementing functions specified in one or more steps of the flow chart and/or in one or more blocks of the block diagram.

These computer program instructions may also be loaded onto a computer or other programmable data processing device, such that a series of operational steps are performed on a computer or other programmable device to produce computer-implemented processing, thereby instructions executed on a computer or other programmable device provide steps for implementing functions specified in one or more steps of the flow chart and/or in one or more blocks of the block diagram.

INDUSTRIAL APPLICABILITY

The encapsulation method provided by embodiments of the present disclosure can apply the in-situ OAM technology to the SR MPLS, and can effectively perform path verification in the SR MPLS scenario.

What is claimed is:

1. An encapsulation method, comprising:
embedding, at an encapsulation node in an in-situ operation administration and maintenance, IOAM, domain, IOAM information in a segment routing multi-protocol label switching, SR MPLS, header,
wherein the IOAM information comprises: an IOAM header and an IOAM payload, and
wherein the IOAM header comprises a MPLS label value assigned by internet assigned numbers authority, IANA; and
the IOAM header further comprises at least one of: a value identifying whether the IOAM header is at a bottom of a stack, a packet priority field, and an encoded time-to-live value.

2. The method of claim 1, wherein the embedding the IOAM information in the SR MPLS header comprises:
inserting the IOAM header into a SR MPLS label stack, and inserting the IOAM payload between the SR MPLS label stack and a data packet.

3. The method of claim 2, wherein the inserting the IOAM header into the SR MPLS label stack comprises:
obtaining a readable label depth, RLD, value of a label switching router, LSR, comprised in a SR network by using interior gateway protocol, IGP, and inserting the IOAM header into the SR MPLS label stack, wherein a location of inserting is within a stack depth range of the label stack identified by the RLD value of each LSR through which a label switching path, LSP, passes, such that each LSR through which the LSP passes supports processing of the IOAM information.

4. The method of claim 3, wherein the inserting the IOAM header into the SR MPLS label stack, wherein the location of the inserting is within the stack depth range of the label stack identified by the RLD value of each LSR through which the LSP passes, comprises:
determining, when a number of the IOAM headers for insertion is limited, a minimum RLD value in RLD values corresponding to each LSR through which the LSP passes, and inserting the IOAM header into a location of the label stack identified by the minimum RLD value.

5. The method of claim 2, wherein the inserting the IOAM header into the SR MPLS label stack comprises:
inserting a single IOAM header to a bottom of the SR MPLS label stack, when the single IOAM header is allowed to be inserted into any stack depth of the SR MPLS label stack.

6. The method of claim 2, wherein the inserting the IOAM header into the SR MPLS label stack comprises:
inserting the IOAM header into the SR MPLS label stack according to a stack depth specified by each LSR, when a number of the IOAM headers for insertion is not limited and insertion requirements for specified stack depth of different LSRs are satisfied.

7. The method of claim 2, wherein a data packet carrying the IOAM information is identified by an MPLS label assigned by internet assigned numbers authority, IANA.

8. The method of claim 2, wherein the IOAM payload is a proof of transit type length value, POT TLV, and the IOAM payload is used by an intermediate node in the IOAM domain to fill the IOAM information in IOAM data according to a preset algorithm.

9. The method of claim 1, wherein a data packet carrying the IOAM information is identified by an MPLS label assigned by internet assigned numbers authority, IANA.

10. The method of claim 1, wherein the IOAM payload is a proof of transit type length value, POT TLV, and the IOAM payload is used by an intermediate node in the IOAM domain to fill the IOAM information in IOAM data according to a preset algorithm.

11. A non-transitory computer readable storage medium storing a computer program, which causes, when executed by a processor, implementation of the method of claim 1.

12. An encapsulation device, comprising: a processor configured to embed, at an encapsulation node in an in-situ operation administration and maintenance, IOAM, domain, IOAM information in a segment routing multi-protocol label switching, SR MPLS, header,
 wherein the IOAM information comprises: an IOAM header and an IOAM payload, and
 wherein the IOAM header comprises a MPLS label value assigned by internet assigned numbers authority, IANA; and
 the IOAM header further comprises at least one of: a value identifying whether the IOAM header is at a bottom of a stack, a packet priority field, and an encoded time-to-live value.

13. An encapsulation node, comprising: a processor configured to embed, at an encapsulation node in an in-situ operation administration and maintenance, IOAM, domain, IOAM information in a segment routing multi-protocol label switching, SR MPLS, header,
 wherein the IOAM information comprises: an IOAM header and an IOAM payload, and
 wherein the IOAM header comprises a MPLS label value assigned by internet assigned numbers authority, IANA; and
 the IOAM header further comprises at least one of: a value identifying whether the IOAM header is at a bottom of a stack, a packet priority field, and an encoded time-to-live value.

14. The encapsulation node of claim 13, wherein the processor is configured to insert the IOAM header into a SR MPLS label stack, and insert the IOAM payload between the SR MPLS label stack and a data packet.

* * * * *